(12) United States Patent
Zhu et al.

(10) Patent No.: US 10,026,012 B2
(45) Date of Patent: Jul. 17, 2018

(54) METHOD AND APPARATUS FOR SEPARATING OBJECTS, AND NON-TRANSITORY COMPUTER-READABLE RECORDING MEDIUM

(71) Applicants: Jiadan Zhu, Beijing (CN); Xin Wang, Beijing (CN); Shengyin Fan, Beijing (CN); Qian Wang, Beijing (CN); Bo Pang, Beijing (CN)

(72) Inventors: Jiadan Zhu, Beijing (CN); Xin Wang, Beijing (CN); Shengyin Fan, Beijing (CN); Qian Wang, Beijing (CN); Bo Pang, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 27 days.

(21) Appl. No.: 15/267,329

(22) Filed: Sep. 16, 2016

(65) Prior Publication Data

US 2017/0091586 A1    Mar. 30, 2017

(30) Foreign Application Priority Data

Sep. 25, 2015   (CN) .......................... 2015 1 0622828

(51) Int. Cl.
*G06K 9/62*    (2006.01)
*G06K 9/46*    (2006.01)
(Continued)

(52) U.S. Cl.
CPC ......... *G06K 9/6218* (2013.01); *G06K 9/4604* (2013.01); *G06T 7/004* (2013.01);
(Continued)

(58) Field of Classification Search
CPC ................ G06K 9/6218; G06K 9/4604; G06T 2207/10028; G06T 2207/10004
See application file for complete search history.

(56) References Cited

U.S. PATENT DOCUMENTS 9,396,400 B1 *   7/2016   Teichman .......... G06K 9/00771
2009/0290796 A1   11/2009   Shi et al.
(Continued)

FOREIGN PATENT DOCUMENTS

JP    2009-282979 A    12/2009

OTHER PUBLICATIONS

Mendez-Polanco et al. People Detection by a Mobile Robot Using Stereo Vision in Dynamic Indoor Environments, MICAI, 2009, pp. 349-359, Spring-Verlag Berlin Heidelberg.*

(Continued)

*Primary Examiner* — John Strege
(74) *Attorney, Agent, or Firm* — Harness, Dickey & Pierce, P.L.C.

(57) ABSTRACT

A method and an apparatus for separating objects are disclosed. The method includes obtaining a depth image including a plurality of objects; obtaining a two-dimensional image including the objects; performing pixel-clustering using depth values of pixels in the depth image and pixel values of pixels in the two-dimensional image to obtain a plurality of sub-regions; performing region-clustering for the sub-regions to obtain a clustering result as an object separation result; and outputting the object separation result.

11 Claims, 4 Drawing Sheets

(51) Int. Cl.
  *G06T 7/00*  (2017.01)
  *G06T 7/40*  (2017.01)

(52) U.S. Cl.
  CPC .... *G06T 7/408* (2013.01); *G06T 2207/10004* (2013.01); *G06T 2207/10028* (2013.01)

(56) References Cited

U.S. PATENT DOCUMENTS

| | | | |
|---|---|---|---|
| 2011/0064299 A1* | 3/2011 | Zhang | G06T 7/55 382/154 |
| 2014/0254919 A1* | 9/2014 | Sun | G06K 9/3233 382/154 |
| 2015/0371398 A1 | 12/2015 | Qiao et al. | |
| 2016/0155237 A1* | 6/2016 | Hashiguchi | G06T 7/11 382/173 |

OTHER PUBLICATIONS

Written amendment, translated for JP.2016184285 dated Sep. 13, 2017.*
Notification of Reasons for Refusal, translated for JP.2016184285 dated Aug. 15, 2017.*
Notification of Reasons for Refusal, original Japanese JP.2016184285 dated Aug. 15, 2017.*
Harada, C. et al., "Object automatic extraction using depth information," IEICE Technology Research Report, vol. 102, No. 632, pp. 47-52, Jan. 28, 2003 and English Abstract.
Shibata, M., "Real-time person detection based on distance image segmentation," RSJ Journal, vol. 32, No. 6, pp. 68-75, Jul. 15, 2014 and English Abstract.
Japanese Office Action dated Aug. 7, 2017.
Japanese Office Action dated Aug. 15, 2017.

* cited by examiner

METHOD AND APPARATUS FOR SEPARATING OBJECTS, AND NON-TRANSITORY COMPUTER-READABLE RECORDING MEDIUM

BACKGROUND OF THE INVENTION

1. Field of the Invention

The present invention generally relates to the field of image processing, and specifically, a method and an apparatus for separating objects.

2. Description of the Related Art

In the image processing field, the accurate object detection is still a hot and challenging topic. For example, in a crowded scenario where objects are shielded by each other, it is difficult to accurately separate objects from an image. Accordingly, there is a technology based on a stereo (3D) vision, in which objects is separated using a dense depth image without a mistake. However, there is usually a region, where depth values are invalid, in an obtained depth image. For such a depth image, spatial continuity of an object is violated because of invalid depth values, and over-segmentation may occur when the depth image is segmented using only a technology based on stereo vision. That is to say, an object is wrongly segmented into a plurality of objects, thus the accuracy of object separation is severely reduced.

SUMMARY OF THE INVENTION

In view of the above problems, the present invention has an object to provide a method and an apparatus for separating objects that can accurately separate objects from an image, prevent over-segmentation and insufficient segmentation, and improve the accuracy of image processing.

According to an aspect of the present invention, a method for separating objects includes obtaining a depth image including a plurality of objects; obtaining a two-dimensional image including the objects; performing pixel-clustering using depth values of pixels in the depth image and pixel values of pixels in the two-dimensional image to obtain a plurality of sub-regions; performing region-clustering for the sub-regions to obtain a clustering result as an object separation result; and outputting the object separation result.

According to another aspect of the present invention, an apparatus for separating objects includes a first obtainment unit configured to obtain a depth image including a plurality of objects; a second obtainment unit configured to obtain a two-dimensional image including the objects; a pixel-clustering unit configured to perform pixel-clustering using depth values of pixels in the depth image and pixel values of pixels in the two-dimensional image to obtain a plurality of sub-regions; a sub-region-clustering unit configured to perform region-clustering for the sub-regions to obtain a clustering result as an object separation result; and an output unit configured to output the object separation result.

According to another aspect of the present invention, an apparatus for separating objects includes a processor; a memory; and computer program instructions stored in the memory, wherein when the computer program instructions are executed by a computer, the computer performs the steps of obtaining a depth image including a plurality of objects; obtaining a two-dimensional image including the objects; performing pixel-clustering using depth values of pixels in the depth image and pixel values of pixels in the two-dimensional image to obtain a plurality of sub-regions; performing region-clustering for the sub-regions to obtain a clustering result as an object separation result; and outputting the object separation result.

According to another aspect of the present invention, a computer program product includes a non-transitory computer-readable recording medium having stored therein computer program instructions, wherein when the computer program instructions are executed by a computer, the computer performs the steps of obtaining a depth image including a plurality of objects; obtaining a two-dimensional image including the objects; performing pixel-clustering using depth values of pixels in the depth image and pixel values of pixels in the two-dimensional image to obtain a plurality of sub-regions; performing region-clustering for the sub-regions to obtain a clustering result as an object separation result; and outputting the object separation result.

According to the method and the apparatus for separating objects of embodiments of the present invention, pixel-clustering and region-clustering are performed using depth values of pixels in a depth image and pixel values of pixels in a two-dimensional image. Thus, objects can be accurately separated from an image, over-segmentation and insufficient segmentation can be prevented, and the accuracy of image processing can be improved; even though discontinuity of an object occurs because of deficiency of depth values and a cavity in foreground extraction.

DETAILED DESCRIPTION OF THE PREFERRED EMBODIMENTS

In the following, embodiments of the present invention will be described in detail with reference to the accompanying drawings.

Figure 1:
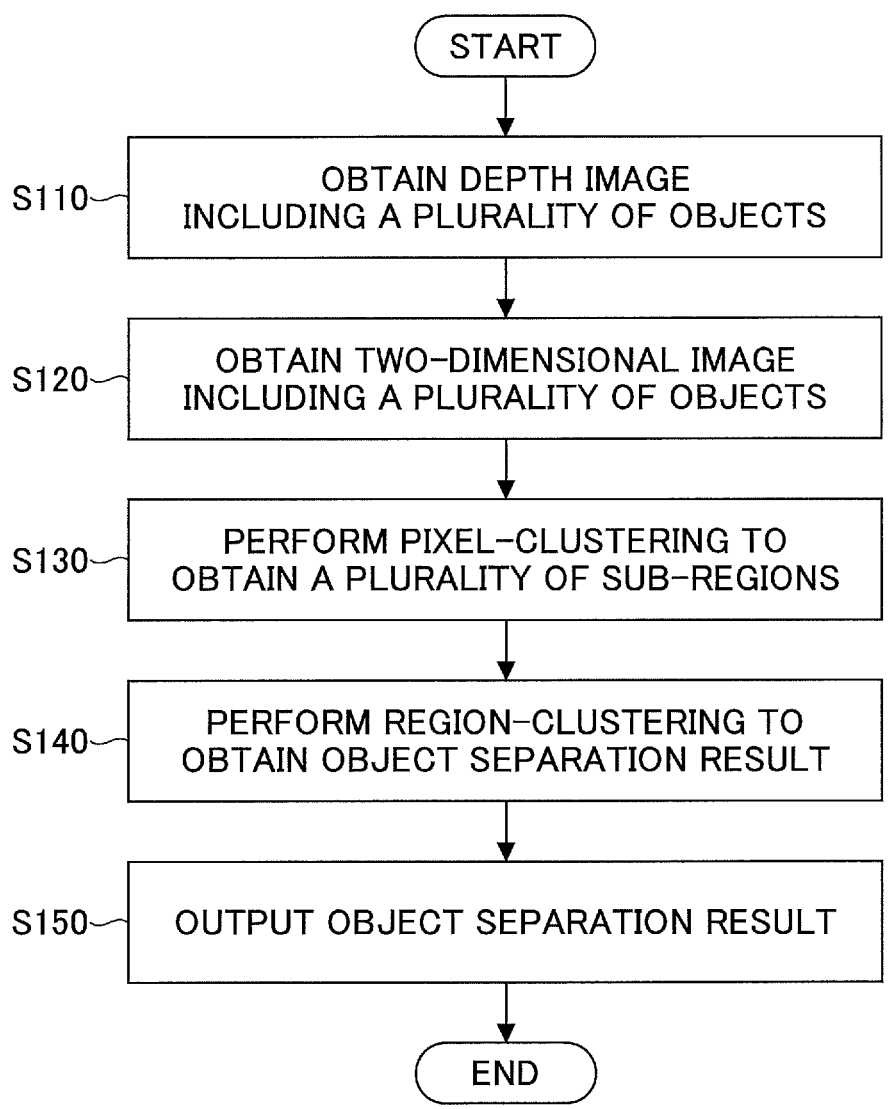
FIG. 1 is a flowchart illustrating main steps of an object separation method according to an embodiment of the present invention.

FIG. 1 is a flowchart illustrating main steps of an object separation method according to an embodiment of the present invention.

As shown in FIG. 1, in step S110, a depth image including a plurality of objects is obtained. For example, the depth image may be obtained by a binocular camera or a TOF (Time of Flight) camera.

And then, in step S120, a two-dimensional image including the objects is obtained. The two-dimensional image corresponds to the depth image and has illumination intensity information. For example, the two-dimensional image may be obtained by an ordinary camera.

It should be noted that, step S120 is shown after step S110 in the flowchart of FIG. 1, however, actually, steps S110 and S120 may be performed in any order (for example, in parallel or a reverse order). For example, imaging may be simultaneously performed for a scene including a plurality of objects by an ordinary camera and a binocular camera, and the depth image and the two-dimensional image are obtained, respectively.

After the depth image and the two-dimensional image are obtained, step S130 of the object separation method is performed. In step S130, pixel-clustering is performed using depth values of pixels in the depth image and pixel values of pixels in the two-dimensional image, so that a plurality of sub-regions are obtained.

Specifically, for each two pixels which are adjacent in the depth image and have a valid depth value, it may be determined whether to perform clustering of the two pixels, based on a first standard. On the other hand, for a first pixel with a valid depth value and a second pixel with an invalid depth value which are adjacent in the depth image, it may be determined whether to perform clustering of the first pixel and the second pixel, based on the first standard and a second standard different from the first standard. Here, the term "valid depth value" means that a pixel has a depth value in the obtained depth image. The term "invalid depth value" means that a depth image of a pixel is missing due to any reason such as low texture level in the obtained depth image. The first standard is different from the second standard. For example, the first standard may be a standard based on a depth value. The second standard may be a standard based on a pixel value in a color space.

More specifically, for two adjacent pixels with a valid depth value, an Euclidean distance between projection points obtained by projecting the two pixels into a bird's-eye view may be calculated as shown in the following equation (1).

$$d_1(p,q)=\|C_p-C_q\|, \quad (1)$$

Where $d_1(p,q)$ represents the Euclidean distance between point p and point q, $C_p$ and $C_q$ are the centers of pixels p and q, respectively, and for example, $C_p$ and $C_q$ are centers of projection points obtained by projecting pixels p and q into the bird's-eye view, respectively.

And then, it may be determined whether the Euclidean distance is less than a first predetermined threshold. The first predetermined threshold may be set by a person skilled in the art as needed, and the present invention is not limited here. For example, the first predetermined threshold may be a threshold based on biological characteristic information. For example, in a case where the object to be separated is a person, the first predetermined threshold may be a threshold based on human-statistical biological characteristic information, such as head length, upper-body length, head width, shoulder width or the like.

Figure 2A:
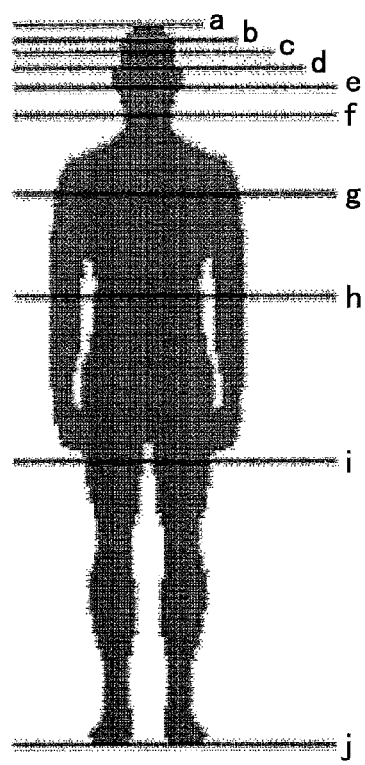
FIGS. 2A and 2B are schematic drawings illustrating a method for determining a first predetermined threshold in the object separation method according to the embodiment of the present invention.
Figure 2B:
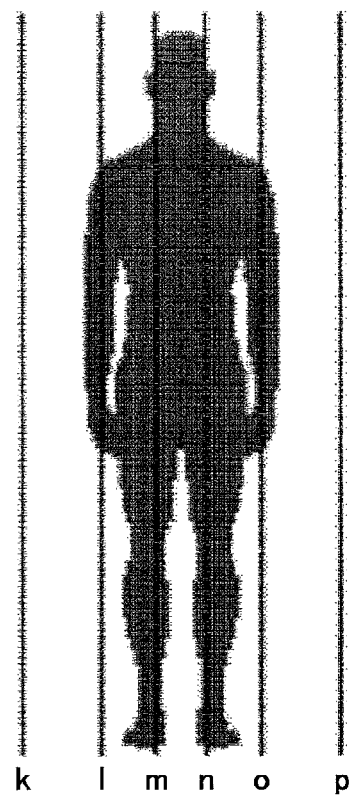

FIGS. 2A and 2B are schematic drawings illustrating a determination method of the first predetermined threshold. In FIG. 2A, the height of a person is appropriately segmented by a set of horizontal lines a-j, and several values such as head length |af|, upper-body length |ah|, whole-body length |aj| and the like are determined. In FIG. 2B, the width of a person is properly segmented by a set of vertical lines k-p, and several values such as head width |mn|, shoulder width |lo| and the like are determined. When performing pixel-clustering, the threshold may be appropriately selected based on required design accuracy. For example, the first predetermined threshold may be selected from equation set (2) as shown below.

$$|ai| = |aj|/\phi = \text{Height}/\phi \quad (2)$$
$$|ah| = |ai|/\phi = \text{Height}/\phi^2$$
$$\vdots$$
$$|ab| = \text{Height}/\phi^8$$
$$|mn| = |ae| = \text{Height}/\phi^5$$
$$|lo| = |ag| = \text{Height}/\phi^3$$

Where Height is a pixel height, the pixel height is obtained by calculating the pixel depth values and a camera pose, the camera pose includes a height and a pitch angle of a camera, φ is a constant, and for example, φ≈1.618.

As an example, when performing pixel-clustering, a relatively small first predetermined threshold is selected; for example, |ac|=Height/$\phi^7$.

It should be noted that, the example of the determination method of the first predetermined threshold in a case where the separated object is a person is described above. However, the object separation method according to the embodiment of the present invention is not limited to this, and may also be applied to separation of other various objects.

Furthermore, it should be noted that, the example of the determination method of the first predetermined threshold in a case of biological characteristic information is described. However, the object separation method according to the embodiment of the present invention is not limited to this; any appropriate threshold may be set as needed, and the detailed description is omitted here.

When it is determined that the Euclidean distance is not less than the first predetermined threshold, it means that the two pixels do not belong to the same object, and no processing is performed for the two pixels. On the other hand, when it is determined that the Euclidean distance is less than the first predetermined threshold, it means that the two pixels belong to the same object, and clustering of the two pixels is performed.

It should be noted that, the first standard and its calculation method in a case of the Euclidean distance is described above. However, as known by a person skilled in the art, the object separation method according to the embodiment of the present invention is not limited to this, as the first standard based on any distance space may be used, and the detailed description is omitted here.

The processing method for two pixels which are adjacent to each other and have a valid depth value is described above. In the following, a case where the pixels are adjacent to each other and one of the two pixels has an invalid depth value will be described.

Specifically, for a pixel with a valid depth value (for convenience of explanation, hereinafter referred to as a "first pixel") and a pixel with an invalid depth value (for convenience of explanation, hereinafter referred to as a "second pixel") which are adjacent in the depth image, a Manhattan distance in a color space between a pixel corresponding to the first pixel in the two-dimensional image and a pixel corresponding to the second pixel in the two-dimensional image may be calculated.

More specifically, for example, the Manhattan distance may be calculated by the following equation (3).

$$d_2(p,q)|\text{RGB}(p)-\text{RGB}(q)| \quad (3)$$

Where RGB(p) and RGB(q) are RGB values of pixel p and pixel q in an RGB space, respectively, and $d_2(p,q)$ is a Manhattan distance between pixel p and pixel q.

And then, it is determined whether the Manhattan distance is less than a second predetermined threshold. The second predetermined threshold may be appropriately set by a person skilled in the art as needed, and the present invention is not limited this. For example, the second predetermined threshold may be 10, 15 or the like.

When it is determined that the Manhattan distance is not less than a second predetermined threshold, it means that the two pixels do not belong to the same object, and no processing is performed for the two pixels.

On the other hand, when it is determined that the Manhattan distance is less than the second predetermined threshold, the depth value of the first pixel is propagated to the depth value of the second pixel. For example, the depth value of the second pixel may be set as the depth value of the first pixel. Accordingly, the second pixel also have a valid depth value.

And then, determination for the two pixels is performed based on the first standard. Namely, an Euclidean distance between projection points obtained by projecting the first pixel and the second pixel after propagating of the depth value into a bird's-eye view is calculated. The calculation method is the method as described above, and the description is omitted here. And then, it is determined whether the Euclidean distance is less than a first predetermined threshold. When it is determined that the Euclidean distance is not less than the first predetermined threshold, it means that the two pixels do not belong to the same object, and no processing is performed for the two pixels. On the other hand, when it is determined that the Euclidean distance is less than the first predetermined threshold, it means that the first pixel and the second pixel belong to the same object, and clustering of the first pixel and the second pixel is performed.

It should be noted that, an example based on equation (3) of an RGB image is described above. However, as known by a person skilled in the art, the object separation method according to the embodiment of the present invention is not limited here and may also applied to a grayscale image, an image in another color space and the like, and the detailed description is omitted here.

Additionally, it should be noted that, the first standard and its calculation method of a Manhattan distance is described above. However, as known by a person skilled in the art, the object separation method according to the embodiment of the present invention is not limited here; the second standard based on any other distance space may be used, and the detailed description is omitted here.

As described above, pixel-clustering is performed by the above processing for the pixels in the image, so that a plurality of sub-regions are obtained. By performing pixel-clustering, a depth value is given to pixels without a valid depth value in the image, and spatial continuity is greatly improved.

And then, in step S140 of the object separation method, region-clustering is performed for the sub-regions to obtain a clustering result as an object separation result.

Specifically, for each two adjacent sub-regions in the sub-regions which are adjacent to each other, it may be determined whether to perform clustering of the adjacent sub-regions, based on a first standard. On the other hand, for a first neighboring sub-region and a second neighboring sub-region, which are closest to each other, in sub-regions which are not adjacent to each other, it may be determined whether to perform clustering of the first neighboring sub-region and the second neighboring sub-region, based on the first standard and a second standard different from the first standard.

More specifically, for each two adjacent sub-regions in the sub-regions which are adjacent to each other, an Euclidean distance between projection points obtained by projecting respective predetermined reference points of the two adjacent sub-regions into a bird's-eye view may be calculated. For example, the calculation method is shown as equation (1), where $C_p$ and $C_q$ represent the projection points obtained by projecting predetermined reference points (e.g., center points) of the sub-regions into a bird's-eye view, respectively.

And then, it is determined whether the Euclidean distance is less than a third predetermined threshold. As an example, the third predetermined threshold may be any value set by a person skilled in the art. As another example, similarly to the above first predetermined threshold, the third predetermined threshold may be a threshold based on biological characteristic information. Preferably, the third predetermined threshold used in region-clustering is greater than the first predetermined threshold used in pixel-clustering. For example, the third predetermined threshold may be set as $|mn|=|ae|=Height/\varphi^5$ as shown in FIG. 2. Additionally, when performing a plurality of times of region-clustering, the third predetermined threshold may become greater with increasing of execution times. For example, when performing region-clustering for a first time, the third predetermined threshold may be $|mn|$. When performing region-clustering for a second time, the third predetermined threshold may be $|af|$. When performing region-clustering for a third time, the third predetermined threshold may be $|lo|$, and so on.

When it is determined that the Euclidean distance is not less than the third predetermined threshold, it means that the two adjacent sub-regions do not belong to the same object, and no processing is performed. On the other hand, when it is determined that the Euclidean distance is less than the third predetermined threshold, it means that the two adjacent sub-regions belong to the same object, and clustering of the adjacent sub-regions is performed.

On the other hand, for two neighboring sub-regions, which are closest to each other, in sub-regions which are not adjacent to each other (for convenience of explanation, hereinafter referred to as a "first neighboring sub-region" and a "second neighboring sub-region", respectively), Manhattan distances in a color space between pixels in the first neighboring sub-region and pixels in the second neighboring sub-region in the two-dimensional image may be calculated, so that an average Manhattan distance between the first neighboring sub-region and the second neighboring sub-region is obtained.

Preferably, in order to reduce calculation amount of the processing, regions which are partly adjacent to each other in the first neighboring sub-region and the second neighboring sub-region, such as circular regions may be selected, and Manhattan distances between pixels in the regions which are partly adjacent to each other may be calculated.

More specifically, for example, the average Manhattan distance may be calculated by the following equation (4).

$$d_{mean} = \frac{1}{|A||B|}\sum_{a \in A}\sum_{b \in B} d(a, b) \quad (4)$$

Where, A and B represent the first neighboring sub-region and the second neighboring sub-region, respectively, d(a,b)

is a Manhattan distance between any two pixels in the first neighboring sub-region and the second neighboring sub-region, |A| is a total number of pixels of the first neighboring sub-region, |B| is a total number of pixels of the second neighboring sub-region, and $d_{mean}$ is an average Manhattan distance between the first neighboring sub-region A and the second neighboring sub-region B.

And then, it is determined whether the average Manhattan distance is less than a fourth predetermined threshold. Similarly to the second predetermined threshold, the fourth predetermined threshold may be appropriately set by a person skilled in the art as needed, and the present invention is not limited to this.

When it is determined that the average Manhattan distance is not less than a fourth predetermined threshold, it means that the first neighboring sub-region and the second neighboring sub-region do not belong to the same object, and no processing is performed for the two pixels.

On the other hand, when it is determined that the average Manhattan distance is less than the fourth predetermined threshold, the determination for the first neighboring sub-region and the second neighboring sub-region is performed again based on the first standard. Specifically, an Euclidean distance between projection points obtained by projecting a first predetermined reference point of the first neighboring sub-region and a second predetermined reference point of the second neighboring sub-region into a bird's-eye view may be calculated. The calculation method has been described above, and the description is omitted here.

And then, it is determined whether the Euclidean distance is less than a third predetermined threshold. When it is determined that the Euclidean distance is not less than the third predetermined threshold, it means that the first neighboring sub-region and the second neighboring sub-region do not belong to the same object, and no processing is performed.

On the other hand, when it is determined that the Euclidean distance is less than the third predetermined threshold, it means that the first neighboring sub-region and the second neighboring sub-region belong to the same object, and clustering of the first neighboring sub-region and the second neighboring sub-region is performed.

As described above, region-clustering is performed, and clustering blocks serving as a clustering result are obtained. Preferably, in order to improve the accuracy of object separation, in the object separation method according to the embodiment of the present invention, the processing of region-clustering may be performed iteratively. The termination condition of the iteration may be, for example, a condition that the number of times the iteration reaches a predetermined number of iterations, a condition that the area of clustering blocks reaches a predetermined threshold, or the like.

And then, in step S150 of the object separation method, the object separation result is outputted.

Preferably, after the clustering result is obtained, subsequent processing, such as noise filtering, shape recognition and the like may be further performed before output. Accordingly, the object separation result can be further optimized, and the accuracy of object separation can be improved.

It should be noted that, as described above, subsequent pixel-clustering and region-clustering are performed directly based on the original depth image and two-dimensional image, without extracting a foreground image. In this case, after the result of region-clustering is obtained, in order to further improve the accuracy of object separation, it may also be verified whether the obtained cluster block is an object of interest, by corresponding subsequent processing.

Preferably, before performing pixel-clustering, a foreground image may be extracted based on at least one of the depth image and the two-dimensional image. Specifically, foreground of an image may be extracted using any known technology of foreground extraction such as background modeling or the like. Accordingly, the extracted foreground image is outputted to step S130 to perform pixel-clustering. Thus, interference of a background image can be avoided, the accuracy of object separation can be further improved, the calculation amount of subsequent processing can be reduced, and processing efficiency can be improved.

The object separation method according to the embodiment of the present invention is described above with reference to FIGS. 1 and 2. According to the method for separating objects of embodiments of the present invention, pixel-clustering and region-clustering are performed using depth values of pixels in a depth image and pixel values of pixels in a two-dimensional image. Thus, objects can be accurately separated from an image, over-segmentation and insufficient segmentation can be prevented, and the accuracy of image processing can be improved; even though discontinuity of an object occurs because of deficiency of depth values and a cavity in foreground extraction.

In the following, an object separation apparatus according to an embodiment of the present invention will be described with reference to FIG. 3.

Figure 3:
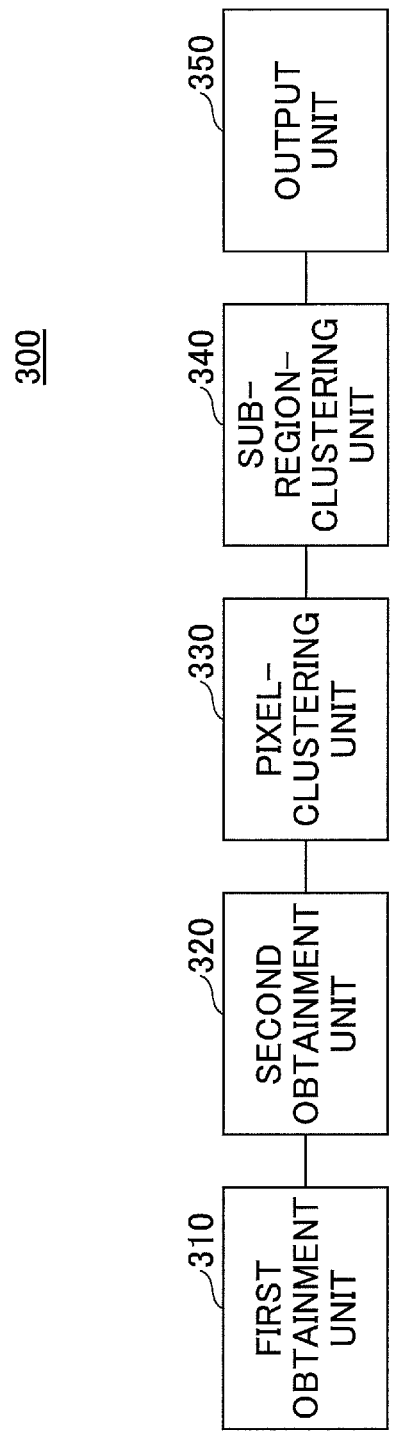
FIG. 3 is a block diagram illustrating a main configuration of an object separation apparatus according to an embodiment of the present invention.

FIG. 3 is a block diagram illustrating a main configuration of the object separation apparatus according to an embodiment of the present invention. As shown in FIG. 3, the object separation apparatus 300 according to the embodiment of the present invention mainly includes a first obtainment unit 310, a second obtainment unit 320, a pixel-clustering unit 330, a sub-region-clustering unit 340, and an output unit 350.

The first obtainment unit 310 obtains a depth image including a plurality of objects.

The second obtainment unit 320 obtains a two-dimensional image including the objects.

The pixel-clustering unit 330 performs pixel-clustering using depth values of pixels in the depth image and pixel values of pixels in the two-dimensional image to obtain a plurality of sub-regions.

The sub-region-clustering unit 340 performs region-clustering for the sub-regions to obtain a clustering result as an object separation result.

The output unit 350 outputs the object separation result.

In an example, the pixel-clustering unit 330 includes a first standard determination unit configured to determine, for each two pixels which are adjacent in the depth image and have a valid depth value, based on a first standard, whether to perform clustering of the two pixels; and a second standard determination unit configured to determine, for a first pixel with a valid depth value and a second pixel with an invalid depth value which are adjacent in the depth image, based on the first standard and a second standard different from the first standard, whether to perform clustering of the first pixel and the second pixel.

In another example, the first standard determination unit includes an Euclidean distance calculation unit configured to calculate an Euclidean distance between projection points obtained by projecting the two pixels into a bird's-eye view; a first threshold determination unit configured to determine whether the Euclidean distance is less than a first predetermined threshold; and an adjacent pixel clustering unit configured to perform clustering of the two pixels, when it is determined that the Euclidean distance is less than the first predetermined threshold.

In another example, the first predetermined threshold is a threshold based on biological characteristic information.

In another example, the second standard determination unit includes a Manhattan distance calculation unit configured to calculate a Manhattan distance in a color space between a pixel corresponding to the first pixel in the two-dimensional image and a pixel corresponding to the second pixel in the two-dimensional image; a second threshold determination unit configured to determine whether the Manhattan distance is less than a second predetermined threshold; a propagating unit configured to propagate the depth value of the first pixel to the depth value of the second pixel, when it is determined that the Manhattan distance is less than the second predetermined threshold; an Euclidean distance calculation unit configured to calculate an Euclidean distance between projection points obtained by projecting the first pixel and the second pixel after propagating of the depth value into a bird's-eye view; a first threshold determination unit configured to determine whether the Euclidean distance is less than a first predetermined threshold; and an adjacent pixel clustering unit configured to perform clustering of the first pixel and the second pixel, when it is determined that the Euclidean distance is less than the first predetermined threshold.

In another example, the sub-region-clustering unit 340 includes a first standard determination unit configured to determine, for each two adjacent sub-regions in the sub-regions which are adjacent to each other, based on a first standard, whether to perform clustering of the adjacent sub-regions; and a second standard determination unit configured to determine, for a first neighboring sub-region and a second neighboring sub-region, which are closest to each other, in sub-regions which are not adjacent to each other, based on the first standard and a second standard different from the first standard, whether to perform clustering of the first neighboring sub-region and the second neighboring sub-region.

In another example, the first standard determination unit includes an Euclidean distance calculation unit configured to calculate an Euclidean distance between projection points obtained by projecting respective predetermined reference points of the two adjacent sub-regions into a bird's-eye view; a third threshold determination unit configured to determine whether the Euclidean distance is less than a third predetermined threshold; and an adjacent sub-region clustering unit configured to perform clustering of the adjacent sub-regions, when it is determined that the Euclidean distance is less than the third predetermined threshold.

In another example, the third predetermined threshold is a threshold based on biological characteristic information.

In another example, the second standard determination unit includes a Manhattan distance calculation unit configured to calculate Manhattan distances in a color space between pixels in the first neighboring sub-region and pixels in the second neighboring sub-region in the two-dimensional image to obtain an average Manhattan distance between the first neighboring sub-region and the second neighboring sub-region; a fourth threshold determination unit configured to determine whether the average Manhattan distance is less than a fourth predetermined threshold; a Euclidean distance calculation unit configured to calculate an Euclidean distance between projection points obtained by projecting a first predetermined reference point of the first neighboring sub-region and a second predetermined reference point of the second neighboring sub-region into a bird's-eye view, when it is determined that the average Manhattan distance is less than the fourth predetermined threshold; a third threshold determination unit configured to determine whether the Euclidean distance is less than a third predetermined threshold; and a neighboring sub-region clustering unit configured to perform clustering of the first neighboring sub-region and the second neighboring sub-region, when it is determined that the Euclidean distance is less than the third predetermined threshold.

In another example, the object separation apparatus 300 further includes a foreground extraction unit configured to extract, based on at least one of the depth image and the two-dimensional image, a foreground image, before performing pixel-clustering. The pixel-clustering unit 330 performs pixel-clustering using depth values of pixels in the extracted foreground image and the pixel values of the pixels in the two-dimensional image to obtain the sub-regions.

Configuration and operation of units of the object separation apparatus 300 have been described in the description of the object separation method with reference to FIGS. 1 and 2, and the description is omitted here.

Figure 4:
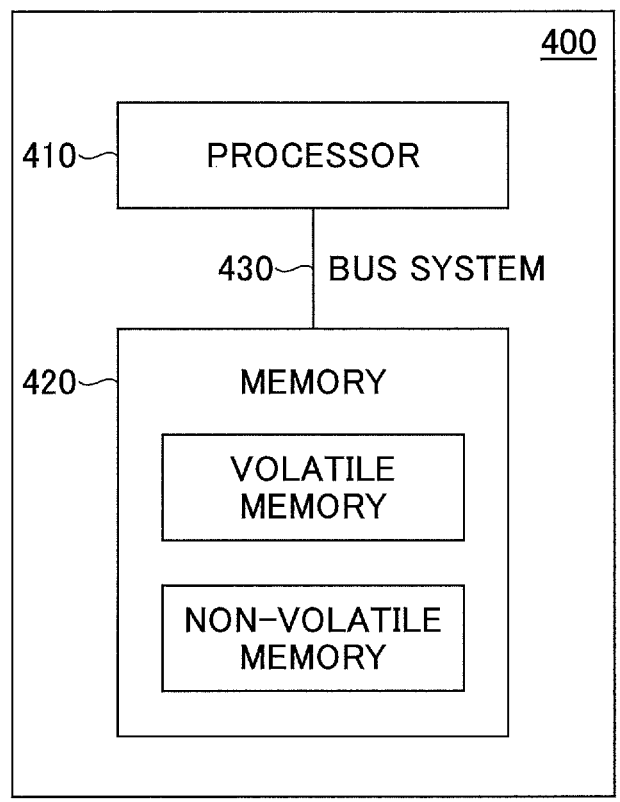
FIG. 4 is a block diagram illustrating a main configuration of an object separation apparatus according to another embodiment of the present invention.

FIG. 4 is a block diagram illustrating main configuration of an object separation apparatus according to another embodiment of the present invention.

As shown in FIG. 4, the object separation apparatus 400 according to the embodiment of the present invention mainly includes one or more processors 410 and memories 420, and such components are connected via a bus system 430 and/or any other connection mechanism (not shown). It should be noted that, the components and mechanism of the object separation apparatus 400 shown in FIG. 4 are just an example and the present invention is not limited to such an example, and the object separation apparatus 400 may also include another component and mechanism as needed.

The processor 410 may be a central processing unit (CPU) or any other processing unit having data processing ability and/or command executing ability, and may control other components in the object separation apparatus 400 to execute desired functions.

The memory 420 may include one or more computer program products, the computer program products may include various computer-readable storage media, such as volatile memories and/or non-volatile memories. The volatile memory may include, for example, a random access memory (RAM) and/or a high-speed buffer storage (cache) or the like. The non-volatile memory may include, for example, a read-only memory (ROM), a hard disk, a flash memory or the like. One or more computer program instructions may be stored in the computer-readable storage medium, and the processor 420 may execute the program instructions to realize functions of the object separation method according to the embodiments of the present invention and/or other desired functions.

The object separation apparatus according to the embodiment of the present invention is described above with reference to FIGS. 3 and 4. According to the apparatus for separating objects of embodiments of the present invention, pixel-clustering and region-clustering are performed using depth values of pixels in a depth image and pixel values of pixels in a two-dimensional image. Thus, objects can be accurately separated from an image, over-segmentation and insufficient segmentation can be prevented, and the accuracy of image processing can be improved; even though discontinuity of an object occurs because of deficiency of depth values and a cavity in foreground extraction.

The method and the apparatus for separating objects according to the embodiments of the present invention are described above with reference to FIGS. 1 to 4.

It should be noted that, in the present specification, the terms "comprise", "include" or the like mean non-exclusive inclusion, namely, a process, a method, an apparatus or a device including a series of elements includes not only the elements, but also another element not shown or a specific element of the process, method, apparatus or device. If there is no more limitation, an element limited by the term "include one . . . " does not exclude a case where another same element exists in a process, method, apparatus or device including the element.

Additionally, it should be noted that, in the present specification, expressions such as "a first . . . unit" and "a second . . . unit" are just for convenience of explanation, and do not mean that the units must be implemented as two or more physical separated units. Actually, the units may be implemented as one unit, and may also be implemented as a plurality of units as needed.

It should be noted that, a series of processes or steps may be performed in a time order described above, and may also be performed in parallel or separately without being performed in the time order.

From the above descriptions of the embodiments, as known by a person skilled in the art, the present invention may be implemented by a software and a necessary hardware platform, and may also be implemented by only the hardware. According to such understanding, all or a part of the embodiments the present invention that contribute to the background art may be expressed by a form of a software product, and the computer software product may be stored in a storage medium such as ROM/RAM, a magnetic disk, an optical disk or the like, and may include any commands for causing a computer apparatus (such as a personal computer, a server, a network device or the like) to execute the method of all or a part of the embodiments of the present invention.

In the embodiments of the present invention, the units or modules may be implemented by a software to be executed by various processors. For example, a identified executable code module may include one or more physical or logical blocks of a computer command, and for example, the code module may be constructed as an object, a process or a function. However, the executable codes of the identified module may be not physically located at the same address, but may include different commands stored in different address. When these logical commands are combined together, the logical commands configure a unit or a module and realize specified purpose of the unit or the module.

The units or module may also implemented by a software. When considering the level of conventional hardware technology, the unit or module may be implemented by a software; and when not considering the level of conventional hardware technology, a person skilled in the art may construct corresponding hardware circuits to implement corresponding functions. The hardware circuits includes conventional very large scale integration (VLSI) circuits or a gate array, and conventional semiconductor or other separated components such as logical chips, transistors or the like. The module may also be implemented by a programmable hardware equipment, such as a field programmable gate array, a programmable gate array logic, a programmable logic equipment or the like.

The present invention is not limited to the specifically disclosed embodiments, and various modifications, combinations and replacements may be made without departing from the scope of the present invention.

The present application is based on and claims the benefit of priority of Chinese Priority Application No. 201510622828.5 filed on Sep. 25, 2015, the entire contents of which are hereby incorporated by reference.

What is claimed is:

1. A method for separating objects, the method comprising:
    obtaining a depth image including a plurality of objects;
    obtaining a two-dimensional image including the plurality of objects;
    performing pixel-clustering using depth values of pixels in the depth image and pixel values of pixels in the two-dimensional image to obtain a plurality of sub-regions;
    performing region-clustering for the plurality of sub-regions to obtain a clustering result as an object separation result; and
    outputting the object separation result, wherein the performing of the pixel-clustering includes
        determining, for each pair of two pixels adjacent in the depth image and including a valid depth value, whether to perform clustering of the pair of two pixels based on a first standard, and
        determining, for a first pixel with a valid depth value and a second pixel, adjacent to the first pixel in the depth image and with an invalid depth value, whether to perform clustering of the first pixel and the second pixel based on the first standard and a second standard different from the first standard.

2. The method for separating objects according to claim 1, wherein the determining of whether to perform clustering of the pair of two pixels based on the first standard includes
    calculating an Euclidean distance between projection points obtained by projecting the pair of two pixels into a bird's-eye view;
    determining whether the Euclidean distance is less than a first threshold; and
    performing clustering of the pair of two pixels, upon determining that the Euclidean distance is less than the first threshold.

3. The method for separating objects according to claim 2, wherein the first threshold is a threshold based on biological characteristic information.

4. The method for separating objects according to claim 1, wherein the determining of whether to perform clustering of the first pixel and the second pixel based on the first standard and the second standard includes
    calculating a Manhattan distance in a color space between a pixel corresponding to the first pixel in the two-dimensional image and a pixel corresponding to the second pixel in the two-dimensional image;
    determining whether the Manhattan distance is less than a second threshold;
    propagating the depth value of the first pixel to the depth value of the second pixel, upon determining that the Manhattan distance is less than the second threshold;
    calculating an Euclidean distance between projection points obtained by projecting the first pixel and the second pixel after propagating the depth value into a bird's-eye view;
    determining whether the Euclidean distance is less than a first threshold; and performing clustering of the first pixel and the second pixel, upon determining that the Euclidean distance is less than the first threshold.

5. The method for separating objects according to claim 1, further comprising:
extracting, based on at least one of the depth image and the two-dimensional image, a foreground image, before the performing of the pixel-clustering,
wherein the performing of the pixel-clustering includes
performing pixel-clustering using depth values of pixels in the extracted foreground image and the pixel values of the pixels in the two-dimensional image to obtain the sub-regions.

6. An apparatus for separating objects, the apparatus comprising:
at least one camera, configured to obtain a depth image including a plurality of objects and configured to obtain a two-dimensional image including the plurality of objects;
a memory storing computer-readable instructions; and
one or more processors, configured to execute the computer-readable instructions such that the one or more processors are configured to
perform pixel-clustering using depth values of pixels in the depth image and pixel values of pixels in the two-dimensional image to obtain a plurality of sub-regions,
perform region-clustering for the plurality of sub-regions to obtain a clustering result as an object separation result, and
output the object separation result, wherein the one or more processors are configured to execute the computer-readable instructions such that the one or more processors are configured to perform the pixel-clustering by being configured to
determine, for each pair of two pixels adjacent in the depth image and including a valid depth value, whether to perform clustering of the pair of two pixels based on a first standard, and
determine, for a first pixel with a valid depth value and a second pixel, adjacent to the first pixel in the depth image and with an invalid depth value, whether to perform clustering of the first pixel and the second pixel based on the first standard and a second standard different from the first standard.

7. The apparatus for separating objects according to claim 6,
wherein the one or more processors are further configured to execute the computer-readable instructions such that the one or more processors are configured to
determine, for each pair of two pixels adjacent in the depth image and including a valid depth value, whether to perform clustering of the pair of two pixels based on a first standard; and
determine, for a first pixel with a valid depth value and a second pixel, adjacent to the first pixel in the depth image and with an invalid depth value, whether to perform clustering of the first pixel and the second pixel based on the first standard and a second standard different from the first standard.

8. The apparatus for separating objects according to claim 7,
wherein the one or more processors, when determining whether to perform clustering of the pair of two pixels, are further configured to execute the computer-readable instructions such that the one or more processors are configured to
calculate an Euclidean distance between projection points obtained by projecting the pair of two pixels into a bird's-eye view;
determine whether the Euclidean distance is less than a first threshold; and
perform the clustering of the pair of two pixels, upon determining that the Euclidean distance is less than the first threshold.

9. The apparatus for separating objects according to claim 8,
wherein the first threshold is a threshold based on biological characteristic information.

10. The apparatus for separating objects according to claim 7,
wherein the one or more processors, when determining whether to perform clustering of the first pixel and second pixel, are further configured to execute the computer-readable instructions such that the one or more processors are configured to
calculate a Manhattan distance in a color space between a pixel corresponding to the first pixel in the two-dimensional image and a pixel corresponding to the second pixel in the two-dimensional image;
determine whether the Manhattan distance is less than a second threshold;
propagate the depth value of the first pixel to the depth value of the second pixel, upon determining that the Manhattan distance is less than the second threshold;
calculate an Euclidean distance between projection points obtained by projecting the first pixel and the second pixel after propagating the depth value into a bird's-eye view;
determine whether the Euclidean distance is less than a first threshold; and
perform the clustering of the first pixel and the second pixel, upon determining that the Euclidean distance is less than the first threshold.

11. A non-transitory computer-readable recording medium having stored therein a program for causing a computer to execute a process for separating objects when run on the computer, the process comprising:
obtaining a depth image including a plurality of objects;
obtaining a two-dimensional image including the plurality of objects;
performing pixel-clustering using depth values of pixels in the depth image and pixel values of pixels in the two-dimensional image to obtain a plurality of sub-regions;
performing region-clustering for the plurality of sub-regions to obtain a clustering result as an object separation result; and
outputting the object separation result, wherein the performing of the pixel-clustering includes
determining, for each pair of two pixels adjacent in the depth image and including a valid depth value, whether to perform clustering of the pair of two pixels based on a first standard, and
determining, for a first pixel with a valid depth value and a second pixel, adjacent to the first pixel in the depth image and with an invalid depth value, whether to perform clustering of the first pixel and the second pixel based on the first standard and a second standard different from the first standard.

* * * * *